United States Patent
Speldrich

(10) Patent No.: US 8,931,338 B2
(45) Date of Patent: Jan. 13, 2015

(54) FLOW SENSOR WITH BYPASS TAPS IN LAMINAR FLOW ELEMENT LAMINARIZING CHANNEL

(75) Inventor: Jamie Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 206 days.

(21) Appl. No.: 13/596,878

(22) Filed: Aug. 28, 2012

(65) Prior Publication Data

US 2013/0098485 A1 Apr. 25, 2013

Related U.S. Application Data

(60) Provisional application No. 61/549,628, filed on Oct. 20, 2011.

(51) Int. Cl.
*G01F 1/68* (2006.01)
*F17D 1/00* (2006.01)

(52) U.S. Cl.
CPC .......................................... *F17D 1/00* (2013.01)
USPC ...................................................... 73/204.21

(58) Field of Classification Search
USPC ............... 73/861.52, 861.53, 204.21, 204.25, 73/202.5
See application file for complete search history.

(56) References Cited

U.S. PATENT DOCUMENTS

| | | | | |
|---|---|---|---|---|
| 4,362,404 | A | * | 12/1982 | Armstrong ...................... 374/39 |
| 5,228,847 | A | * | 7/1993 | Lywood et al. .................... 431/7 |
| 5,693,880 | A | * | 12/1997 | Maginnis, Jr. ............... 73/202.5 |
| 5,750,892 | A | | 5/1998 | Huang et al. |
| 5,824,894 | A | * | 10/1998 | Lucas et al. .................. 73/202.5 |
| 6,244,293 | B1 | * | 6/2001 | Azima .......................... 137/486 |
| 6,247,495 | B1 | * | 6/2001 | Yamamoto et al. ...... 137/599.13 |
| 6,655,207 | B1 | | 12/2003 | Speldrich et al. |
| 6,886,401 | B2 | * | 5/2005 | Ito et al. .......................... 73/202 |
| 7,670,104 | B2 | * | 3/2010 | Geiger et al. ................. 415/116 |
| 2004/0163461 | A1 | * | 8/2004 | Ito et al. ..................... 73/204.21 |
| 2008/0250854 | A1 | * | 10/2008 | Ding et al. ...................... 73/198 |
| 2012/0192642 | A1 | * | 8/2012 | Speldrich et al. .......... 73/204.11 |

* cited by examiner

*Primary Examiner* — Jewel V Thompson
(74) *Attorney, Agent, or Firm* — Ingrassia Fisher & Lorenz, P.C.

(57) ABSTRACT

A flow sensor includes a main flow body, a laminar flow element, a first bypass tap, and a second flow element sensor tap. The main flow body has a first main flow port, a second main flow port, a main flow channel, a first bypass tap, a second bypass tap, and a bypass flow channel. The laminar flow element is disposed within the main flow channel. The bypass flow channel has a cross sectional area, and the first bypass tap and the second bypass tap each have a cross sectional area that is greater than the maximum cross sectional area of the bypass flow channel.

15 Claims, 14 Drawing Sheets

FLOW SENSOR WITH BYPASS TAPS IN LAMINAR FLOW ELEMENT LAMINARIZING CHANNEL

CROSS-REFERENCE TO RELATED APPLICATION

This application claims the benefit of U.S. Provisional Application No. 61/549,628, filed Oct. 20, 2011.

TECHNICAL FIELD

The present invention generally relates to flow sensors, and more particularly relates to a flow sensor with a laminar flow element and bypass taps within a channel of the laminar flow element, and one or more flow restrictors in the bypass channel.

BACKGROUND

High flow sensors generally use a bypass flow channel in combination with a main flow channel. A laminar flow element (LFE) may be incorporated in the main flow channel. A typical LFE may include multiple parallel flow channels with relatively small cross-sectional area to laminarize the main flow and create a pressure restriction. The bypass flow channel is fluidly communicated to the main flow channel via taps that are disposed perpendicular to the main flow channel. The taps may include a first tap and a second tap, with the first tap disposed upstream of the LFE and the second tap disposed downstream of the LFE.

The perpendicular orientation of the taps presents static pressure at the taps. The difference in the static pressure between the first and second taps drives flow through the bypass flow channel. The flowrate through the bypass flow channel may be controlled by features of the bypass, such as length and diameter, or an orifice or tube shaped feature may be used to limit bypass flow rate.

Disposing the taps upstream and downstream of the LFE places the taps where a large flow volume is available for redirection into the bypass flow channel. However, this arrangement can exhibit certain drawbacks. First, with this arrangement the taps are placed in a more turbulent, large diameter flow zone, and flow agitation from turbulence increases signal noise. Second, the flow passing through the geometry changes at the inlet and outlet of the LFE can create unstable flow and pressure changes at the taps, which can adversely affect sensor signal. Third, non-linear orifice effects that are inherent in restricting flow through the bypass can create non-linear output and a reduction in signal in lower flow ranges.

Hence, there is a need for a flow sensor that addresses the above-noted drawbacks, and/or creates a bypass flow rate with minimal components and size, and/or implements a relatively long bypass flow channel to reduce orifice effects caused by differences in relationship of cross-sectional area of the bypass channel to the partitions in the LFE. The present invention addresses at least these needs.

BRIEF SUMMARY

In one embodiment, a flow sensor includes a main flow body, a laminar flow element, a bypass element, a first bypass tap, and a second bypass tap. The main flow body has a first main flow port, a second main flow port, and a main flow channel between the first main flow port and the second main flow port. The laminar flow element is disposed within the main flow channel between the first main flow port and the second main flow port and has a first end, a second end, and an outer surface. The first end faces the first main flow port, and the second end faces the second main flow port. The bypass element is disposed adjacent to the main flow body and includes a bypass flow channel. The first bypass tap extends through the outer surface of the laminar flow element and is disposed between the first end and the second end of the laminar flow element. The first bypass tap fluidly communicates the main flow channel with the bypass flow channel. The second bypass tap extends through the outer surface of the laminar flow element and is disposed between the first end and the second end of the laminar flow element. The second bypass tap fluidly communicates the main flow channel with the bypass flow channel. The bypass flow channel has a cross sectional area, and the first bypass tap and the second bypass tap each have a cross sectional area that is greater than the cross sectional area of the bypass flow channel.

In another embodiment, a flow sensor includes a main flow body, a laminar flow element, and a flow sensor. The main flow body has a first main flow port, a second main flow port, a main flow channel between the first main flow port and the second main flow ports, a first bypass tap, a second bypass tap, and a bypass flow channel. The laminar flow element is disposed within the main flow channel between the first main flow port and the second main flow port and has a first end and a second end. The first end faces the first main flow port, and the second end faces the second main flow port. The flow sensor is coupled to the main flow body and is disposed within the bypass flow channel. The flow sensor is configured to sense fluid flow through the bypass flow channel. The first bypass tap is disposed between the first end and the second end of the laminar flow element, and fluidly communicates the main flow channel with the bypass flow channel. The second bypass tap is disposed between the first end and the second end of the laminar flow element, and fluidly communicates the main flow channel with the bypass flow channel. The bypass flow channel has a cross sectional area, and the first bypass tap and the second bypass tap each have a cross sectional area that is greater than the cross sectional area of the bypass flow channel.

In yet another embodiment, a flow sensor includes a main flow body, a laminar flow element, and a bypass element. The main flow body has a first main flow port, a second main flow port, a main flow channel between the first main flow port and the second main flow port, a first bypass tap, and a second bypass tap. The laminar flow element is disposed within the main flow channel between the first main flow port and the second main flow port and has a first end, a second end, and an outer surface. The first end faces the first main flow port, and the second end faces the second main flow port. The bypass element is disposed adjacent to the main flow body and has a bypass flow channel. The first bypass tap is disposed between the first end and the second end of the laminar flow element, and fluidly communicates the main flow channel with the bypass flow channel. The second bypass tap is disposed between the first end and the second end of the laminar flow element, and fluidly communicates the main flow channel with the bypass flow channel. The main flow channel is oriented about an axis that extends between the first main flow port and the second main flow port. The first bypass tap and the second bypass tap each have a width in a direction parallel to the axis and a length in a direction perpendicular to the width. The width is less than the length, and the first bypass tap and the second bypass tap each have a cross sectional area that is greater than the cross sectional area of the bypass flow channel.

Furthermore, other desirable features and characteristics of the flow sensor will become apparent from the subsequent detailed description and the appended claims, taken in conjunction with the accompanying drawings and the preceding background.

BRIEF DESCRIPTION OF THE DRAWINGS

Embodiments will hereinafter be described in conjunction with the following drawing figures, wherein like numerals denote like elements, and wherein.

DETAILED DESCRIPTION

Figure 1:
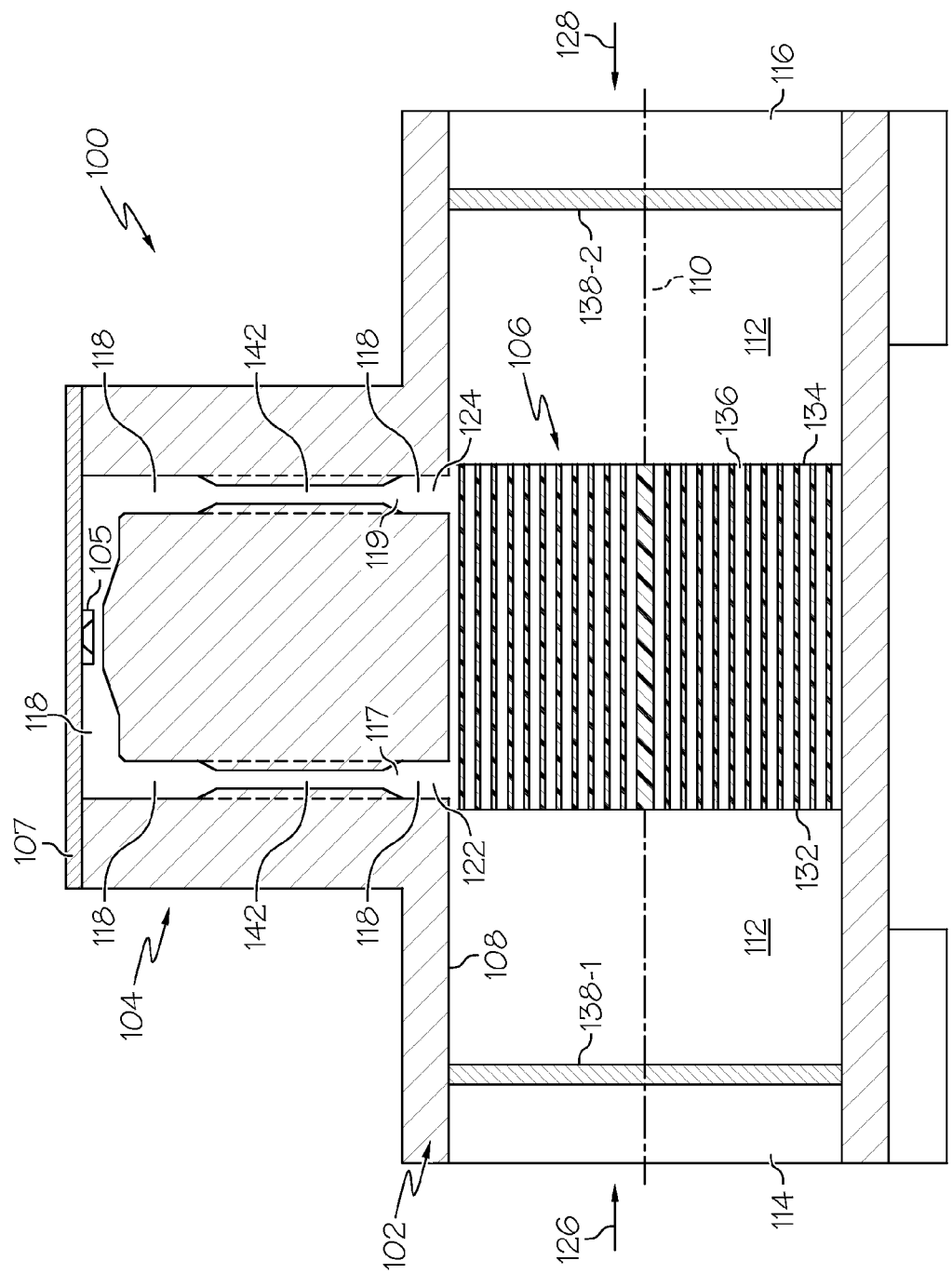
FIGS. 1-4 each depict a simplified cross-section view of an embodiment of a flow sensor according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A simplified cross section view of various embodiments of flow sensor 100 that may be used to measure the rate of flow of a fluid is depicted in FIGS. 1-4, and includes a main flow body 102, a bypass element 104, and a laminar flow element (LFE) 106. Before describing the flow sensor 100 in more detail, it is noted that the flow sensor 100 may be used in any one of numerous systems in which flow rate measurement is desired. Some non-limiting examples include ventilators and respirators.

The main flow body 102, which may be implemented using an integrated structure or a plurality of components, includes an inner surface 108 that defines a main flow channel 112, having a first main flow port 114 and a second main flow port 116. Depending upon how the flow sensor 100 is implemented, fluid may flow into the first main flow port 114, through the main flow channel 112, and out the second main flow port 116. Alternatively, fluid may flow into the second main flow port 116, through the main flow channel 112, and out the first main flow port 114. In either case, the main flow channel 112 preferably has a cross-sectional shape and size compatible with any one of numerous flow systems. The main flow body 102 additionally includes a first bypass tap 122 and a second bypass tap 124, both of which are in fluid communication with the main flow channel 112 and are preferably configured perpendicular to the axis 110.

The bypass element 104 is disposed adjacent to the main flow body 102 and has a bypass flow channel 118 in fluid communication with the first and second bypass taps 122, 124. Thus, a portion of the fluid flowing through the main flow channel 112 enters the bypass flow channel 118. As may be appreciated, the fluid flow rate in the bypass flow channel 118 is typically a fraction of the fluid flow rate in the main flow channel 112. Although the depicted flow sensor 100 includes two bypass taps 122, 124, it will be appreciated that the flow sensor 100 could be implemented with other numbers of bypass taps. It will additionally be appreciated that other methods of communicating flow from the main flow channel 112 to bypass flow channel 118 may be used. Moreover, the bypass element 104 may be formed integrally with the main flow body 102, as depicted in FIG. 1, it may be formed separate from the main flow body 102 and coupled thereto, as depicted in FIGS. 3 and 4, or it may be a combination of integral and separate components, as depicted in FIG. 2.

Figure 2:
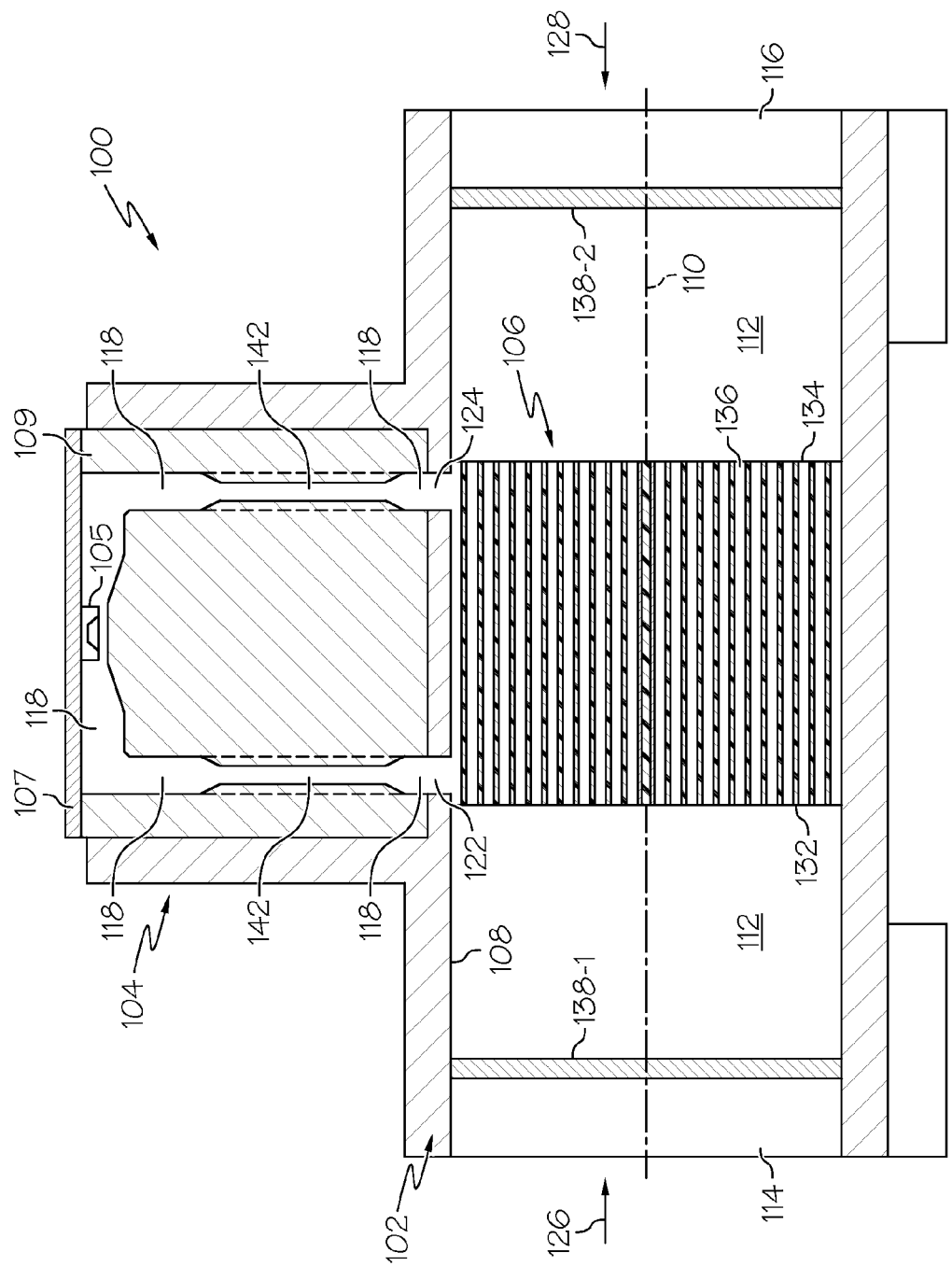
Figure 3:
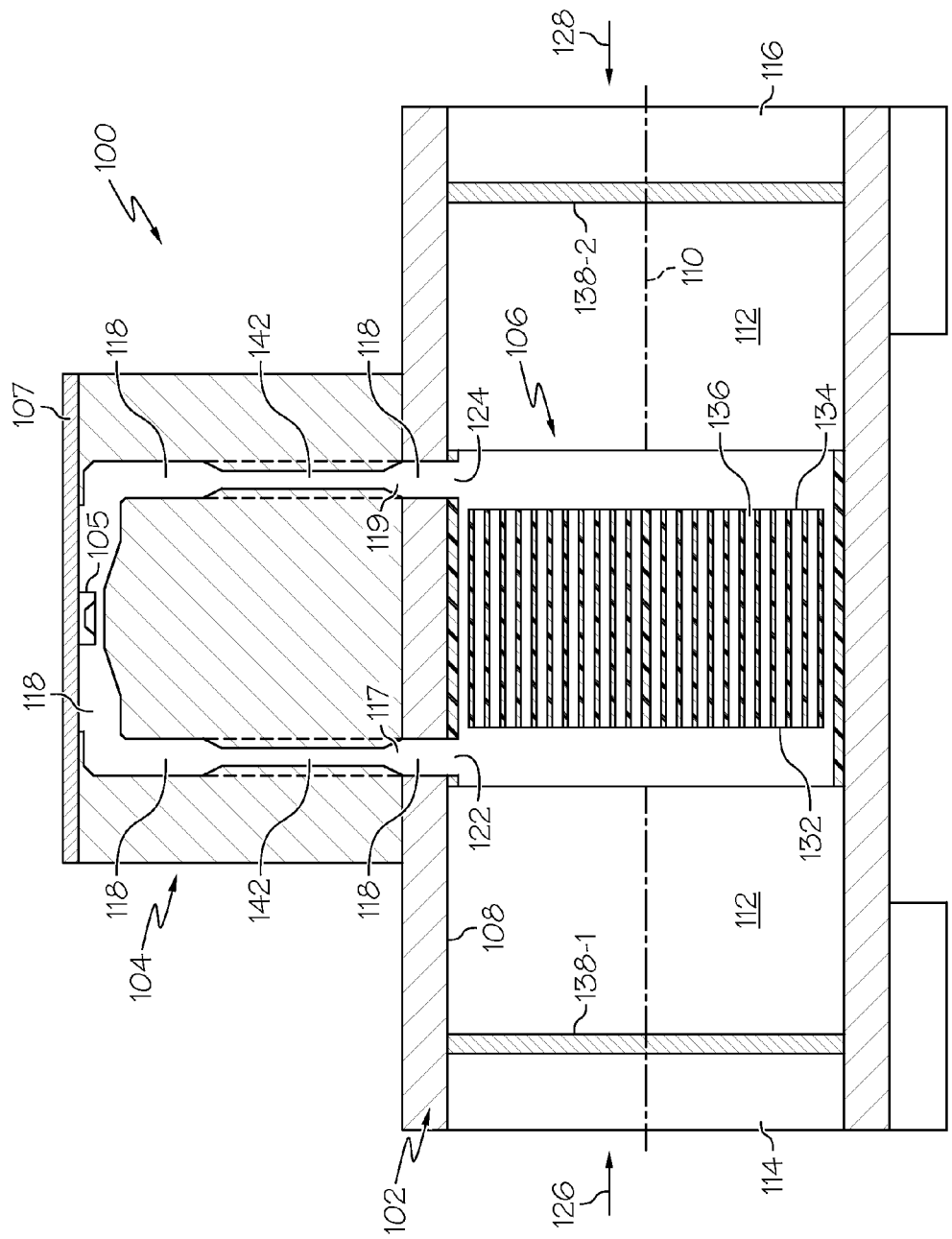
Figure 4:
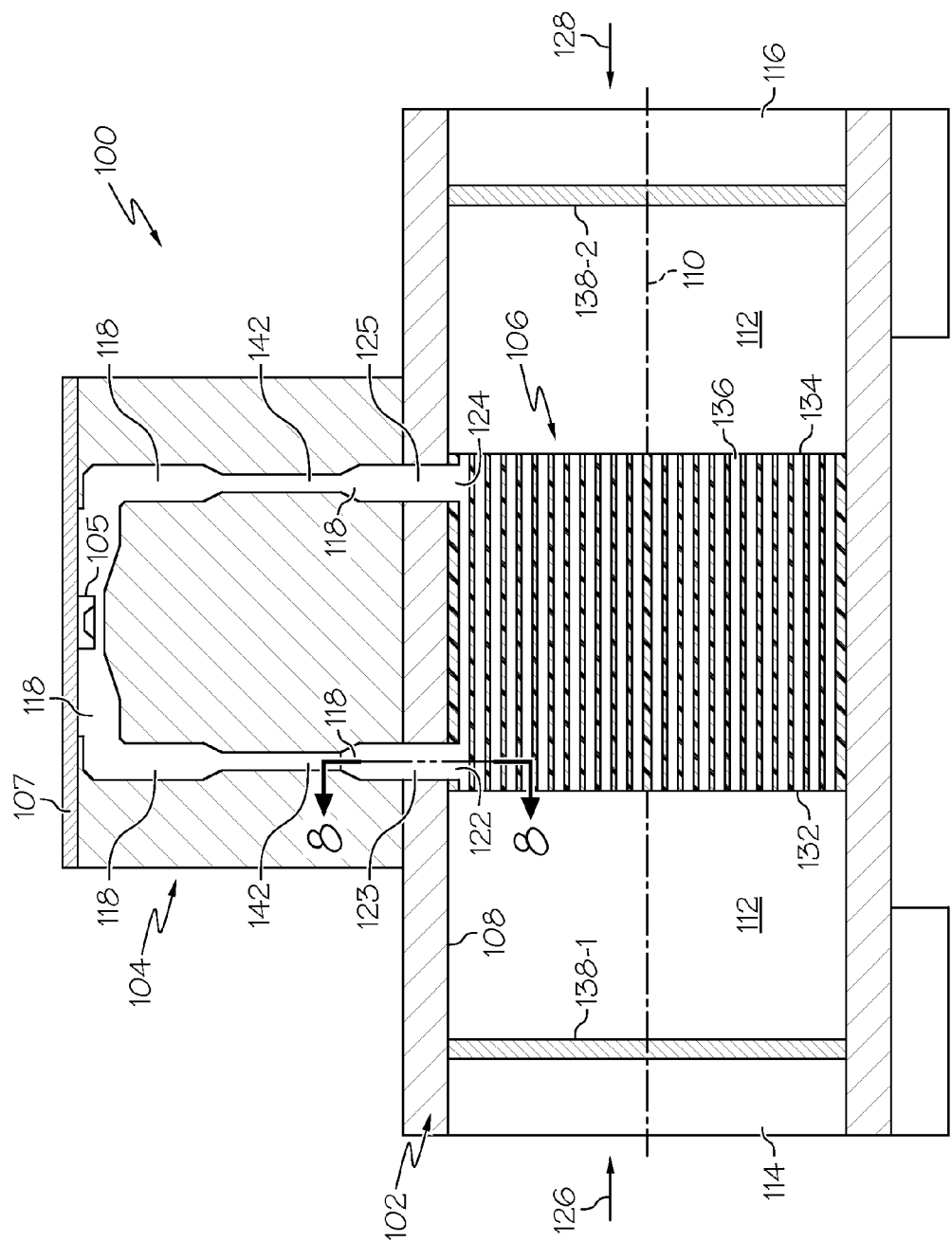

As FIGS. 1-4 further depict, a flow sensor 105 is coupled to the bypass element 104, and is disposed in the bypass flow channel 118. The flow sensor 105 may be variously implemented, but in the depicted embodiment it is implemented using a micro-bridge sensor. The flow sensor 105 may be variously coupled to the bypass element 104. For example, as depicted in FIGS. 1, 2 and 4, the flow sensor 105 may be coupled to or otherwise mounted on a circuit board or plate 107 that is subsequently coupled to the bypass element 104. Alternatively, the flow sensor 105 may be coupled to or otherwise mounted on a circuit board or plate 107 that is coupled to a separate portion 109 that is separately coupled to the remainder of the bypass element 104. During operation, as fluid flows through the main flow channel 112, in either the first direction 126 or the second direction 128, a portion of the fluid flows into and through the bypass flow channel 118. The flow sensor 105 thus measures the flow rate of fluid in the main flow channel 112 indirectly by measuring a fraction of fluid flow through the bypass flow channel 118.

The LFE 106 is disposed in the main flow channel 112 and includes a first end 132 and a second end 134. As is generally known, the LFE 106 causes a pressure differential between the first and second main flow body sensor taps 122, 124, which thereby facilitates fluid flow into the bypass flow channel 118. As is also generally known, the pressure differential is dependent on the geometry of the LFE 106, and increases with flow rate. Furthermore, the fluid flowing in the main flow channel 112 will be increasingly turbulent as the flow rate increases. Thus, the LFE 106, in addition to creating the differential pressure, straightens and laminarizes the fluid flow in the main flow channel 112, thereby reducing turbulence. The LFE 106 reduces turbulence by forcing the fluid to flow through a plurality of flow channels 136. The pressure drop across the LFE 106 may also be dependent on the size and uniformity of these flow channels 136. Preferably, the flow channels 136 are parallel, and may be circular ring shaped, grid shaped, honeycomb shaped, or round tube shaped. It will be appreciated that the LFE 106 may be integrated into a molded housing, or it may be a separate component such as a honeycomb or molded part.

To further straighten and control the fluid flow in the main flow channel 112, the flow sensor 100 may additionally include one or more screens 138 on either or both sides of the LFE 106. In the depicted embodiment, the flow sensor 100 includes two screens—a first screen 138-1 and a second screen 138-2. It will be appreciated, however, that in other embodiments the flow sensor 100 may include more or less than this number of screens 138, if needed or desire.

As FIGS. 3 and 4 further depict, in some embodiments the LFE 106 includes the first and second bypass taps 122, 124. As will be described in more detail further below, in these embodiments the first and second bypass taps 122, 124 extend through an outer surface of the LFE 106, and fluidly communicate the bypass flow channel 118 with the laminarizing zone of the LFE 106 between the first end 132 and the second end 134, respectively, of the LFE 106. In these embodiments, the first bypass tap 122 is disposed closer to the first end 132 of the LFE 106, and the second bypass tap 124 is disposed closer to the second end 134 of the LFE 106. Disposing the first and second bypass taps 122, 124 at these locations ensures that the taps 122, 124 are exposed to a relatively lower Reynolds number, and thus to more laminar flow. This disposition additionally assists in noise reduction in the signal output and reduces pneumatic nonlinear orifice effects that may be created by the inlet and outlet geometry inherent in an LFE 106. Also, the shorter distance between the bypass taps 122, 124, as compared to conventional bypass tap locations, reduces the differential pressure between these bypass taps 122, 124 due to the shorter distance and by eliminating pressure losses at the ends of the LFE 106. This can be advantageous for high sensitivity, fast response time sensors, such as a micro-bridge type sensor.

As FIGS. 3 and 4 also depict, in some embodiments the main flow body 102 may include a first bypass flow port 123 and a second bypass flow port 123. In these embodiments, the first bypass flow port 123 fluidly communicates the first bypass tap 122 with the bypass flow channel 118, and the second bypass flow port 125 fluidly communicates the second bypass tap 124 with the bypass flow channel 118.

As illustrated in the embodiments depicted in FIGS. 1-4, one or more flow restrictors 142 (two depicted) may be disposed in the bypass flow channel 118 or, as depicted in phantom, some embodiments may be implemented without the flow restrictor(s) 142. The flow restrictor(s) 142, if included, limit(s) fluid flow into the bypass flow channel 118 to an acceptable sensing range and may be variously implemented. For example, each flow restrictor 142 may be implemented as a long narrowly shaped tube or as an orifice. No matter the specific implementation, the flow restrictor(s) 142 may be disposed upstream of the flow sensor 105, downstream of the flow sensor 105, or both.

Figure 5:
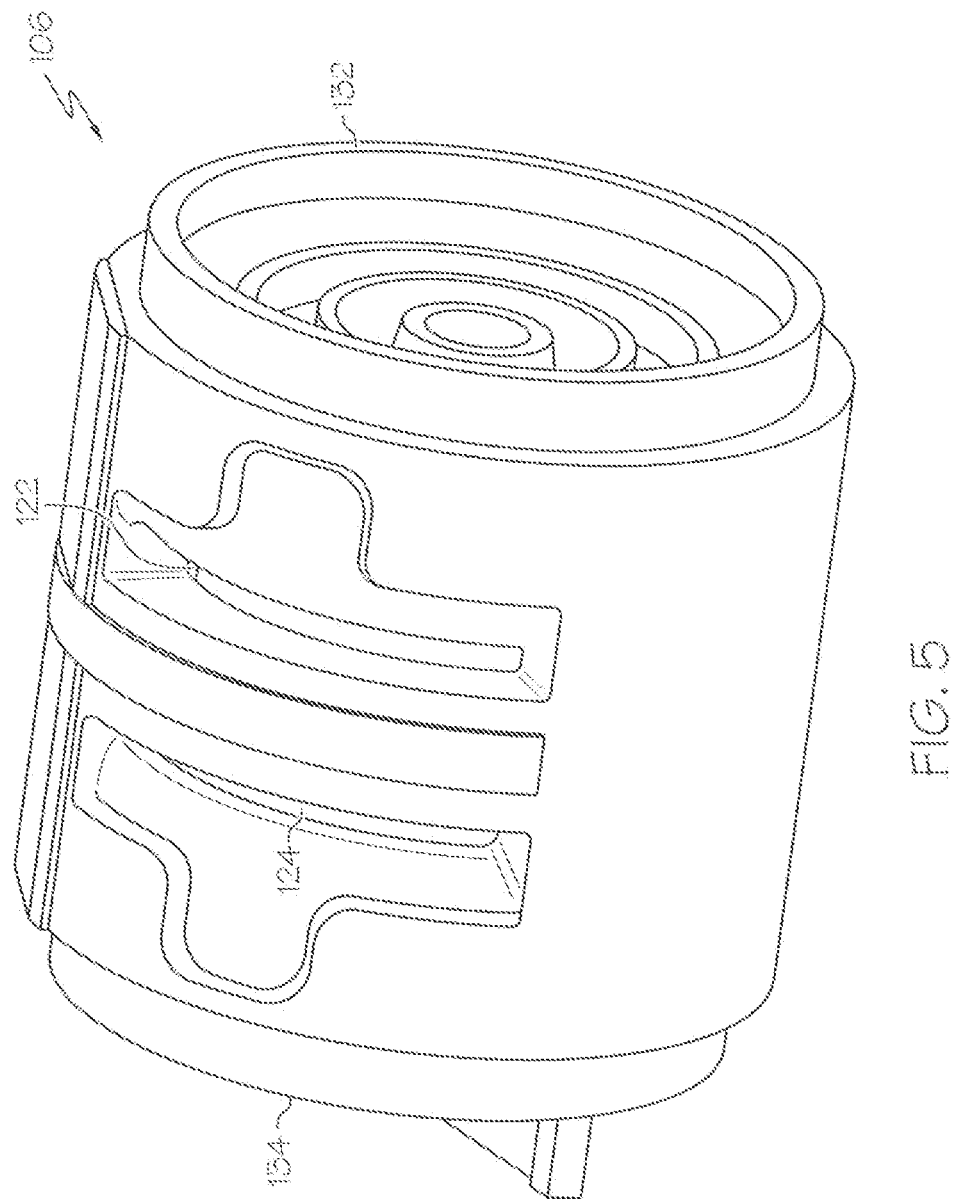
FIG. 5 depicts a plan view of one embodiment of a laminar flow element that may be used to implement the flow sensors of FIGS. 1-4.
Figure 6:
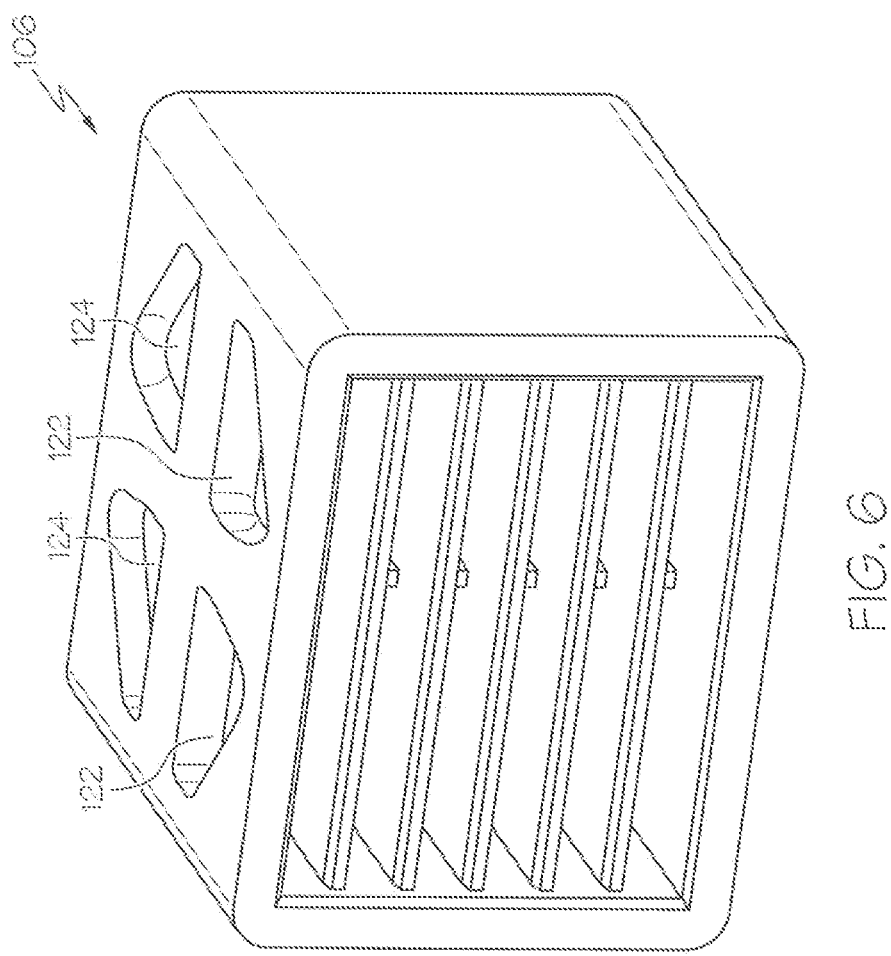
FIGS. 6 and 7 depict plan views of another embodiment of a laminar flow element that may be used to implement the flow sensor of FIGS. 1-4.
Figure 7:
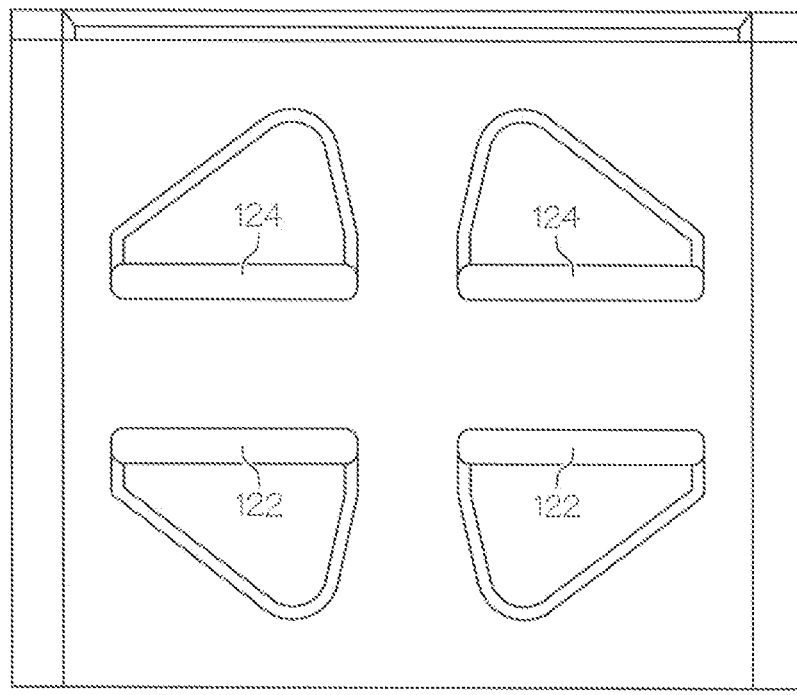
Figure 8:
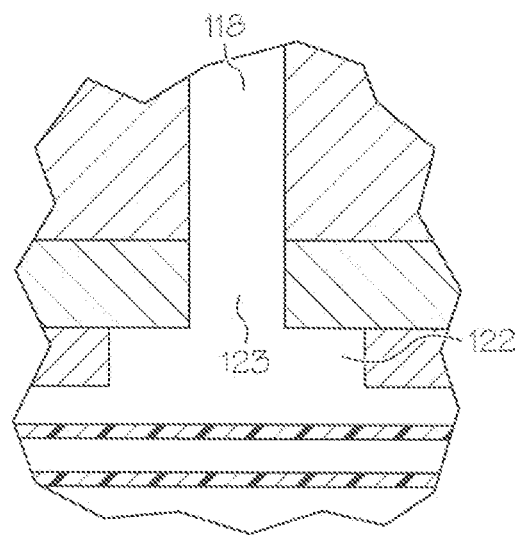
FIG. 8 depicts a partial cross section view of the flow sensor of FIG. 4, taken along line 8-8 in FIG. 1.

Referring now to FIG. 5, one embodiment of the LFE 106 is depicted. In this embodiment, the areas of the first and second bypass taps 122, 124 are enlarged to reduce the flow velocity presented to the bypass flow channel 118. More specifically, the first and second bypass taps 122, 124 each have a cross sectional area that is greater than the typical cross sectional area of the bypass flow channel 118. As depicted more clearly in FIG. 8, the cross sectional areas being referred to are the cross sectional areas perpendicular to the flow direction in the bypass flow channel 118. In the depicted embodiment, the shape of the first and second bypass taps 122, 124 is such that its width is relatively narrow with respect to its axial length. This shape helps avoid disrupting flow in the main flow channel 112. This narrow shape also controls the hydraulic diameter of the first and second bypass taps 122, 124, which assists in laminarizing flow through the bypass flow channel 118. The depicted LFE 106 is also cylindrical in shape, though, as depicted in the exemplary embodiment in FIGS. 6 and 7, it will be appreciated that it could be configured in various other geometric shapes, as needed or desired.

It will be appreciated that the configurations of the first and second bypass taps 122, 124 depicted in FIG. 5 are merely exemplary, and that the first and second flow element sensor taps 123, 125 may be variously configured. For example, as illustrated in the embodiment depicted in FIGS. 6 and 7, the first and second bypass taps 122, 124 may be configured with various polygonal geometric shapes. As will also be described further below, the first and second bypass taps 122, 124 may be configured with multiple round, rectangular, or other geometric cross-sectional shapes. Although the cross-sectional area of the first and second bypass taps 122, 124 is not uniform compared to the LFE 106 and the bypass flow channel 118, the hydraulic diameter of the first and second bypass taps 122, 124 is preferably equal to (or approximately equal to) the hydraulic diameter of the bypass flow channel 118, which aids in reduction of non-linear pneumatic effects.

Figure 9:
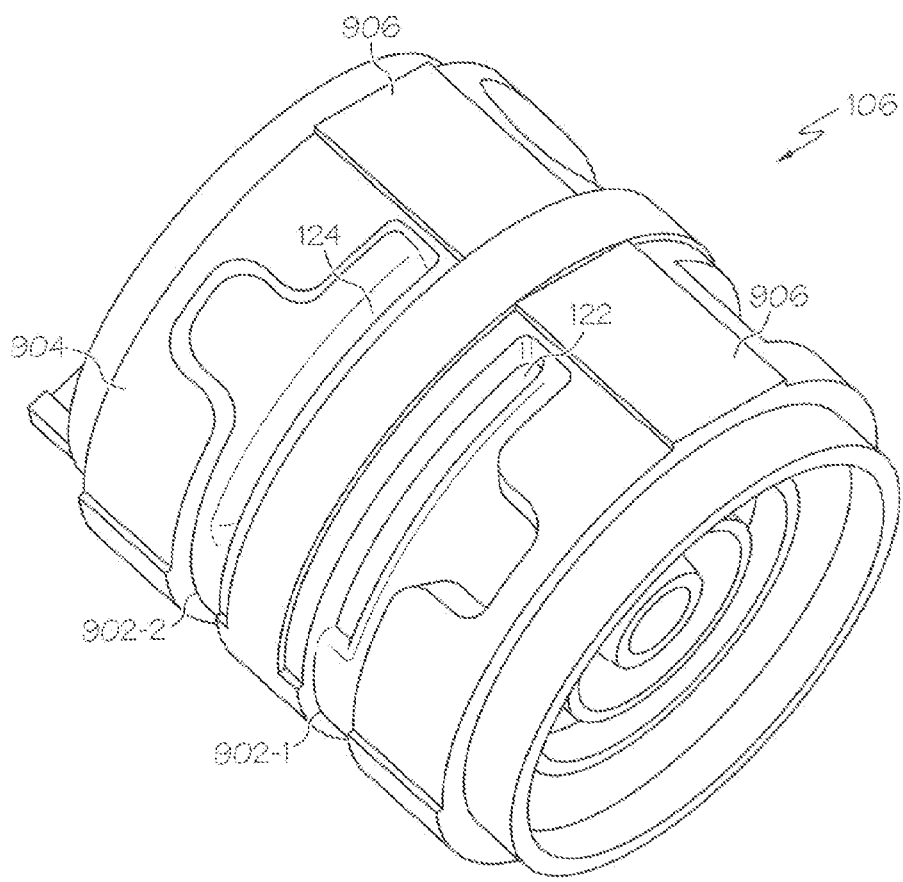
FIGS. 9 and 10 depict plan views of another embodiment of a laminar flow element that may be used to implement the flow sensor of FIGS. 1-4.
Figure 10:
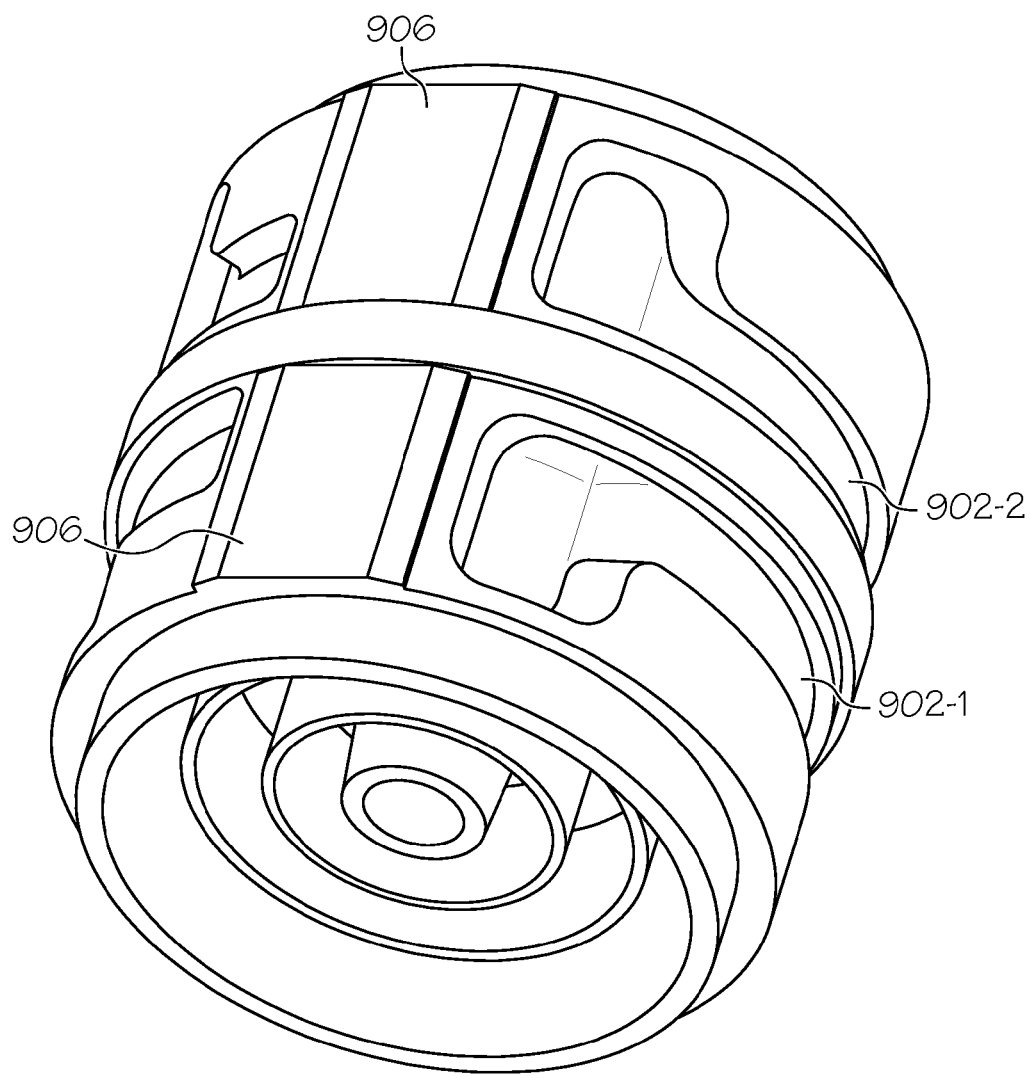
Figure 11:
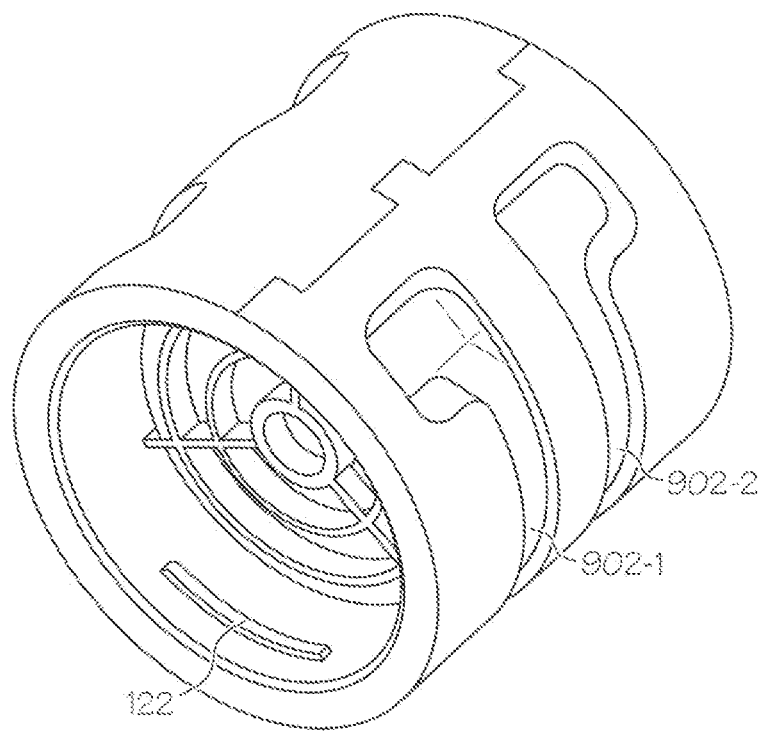
FIGS. 11-14 depict plan views of yet another embodiment of a laminar flow element that may be used to implement the flow sensor of FIGS. 1-4.
Figure 12:
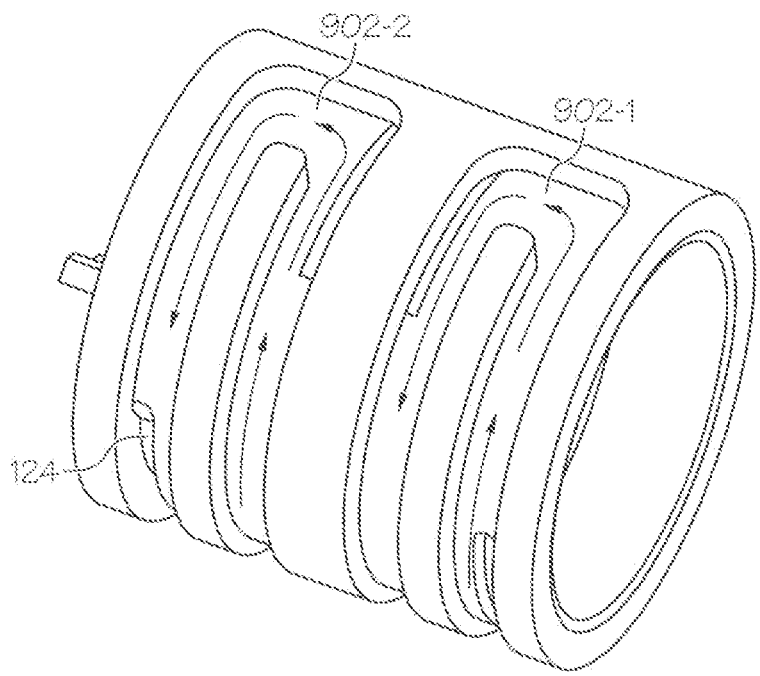
Figure 13:
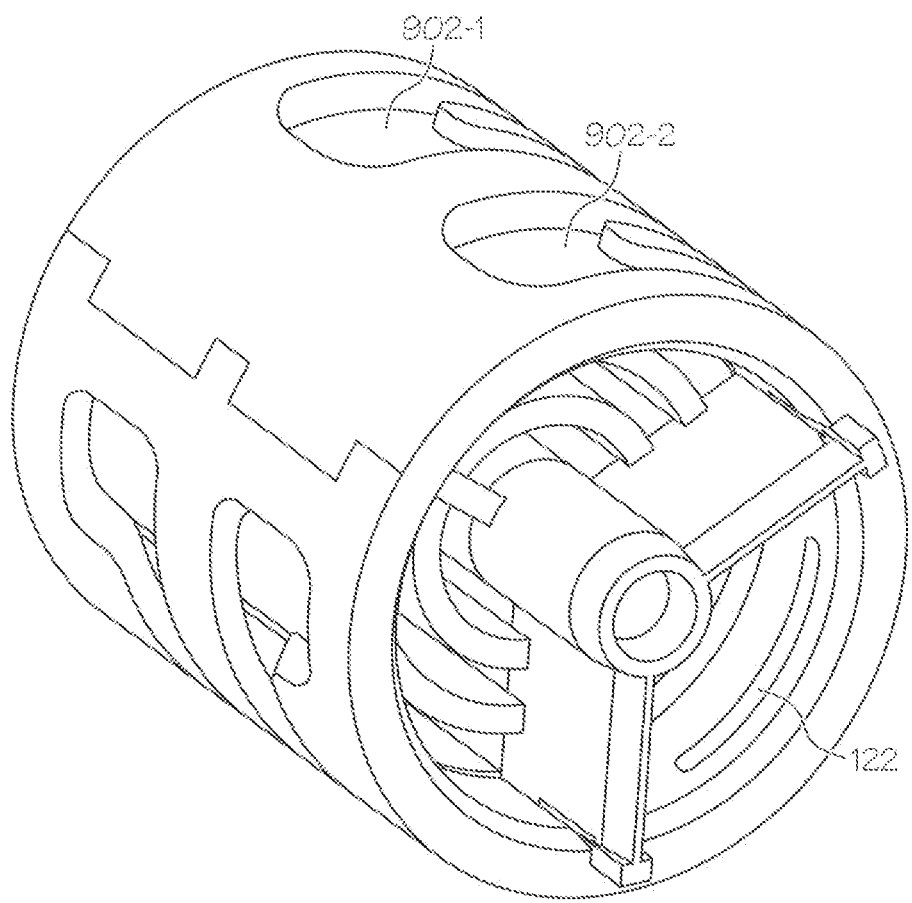
Figure 14:
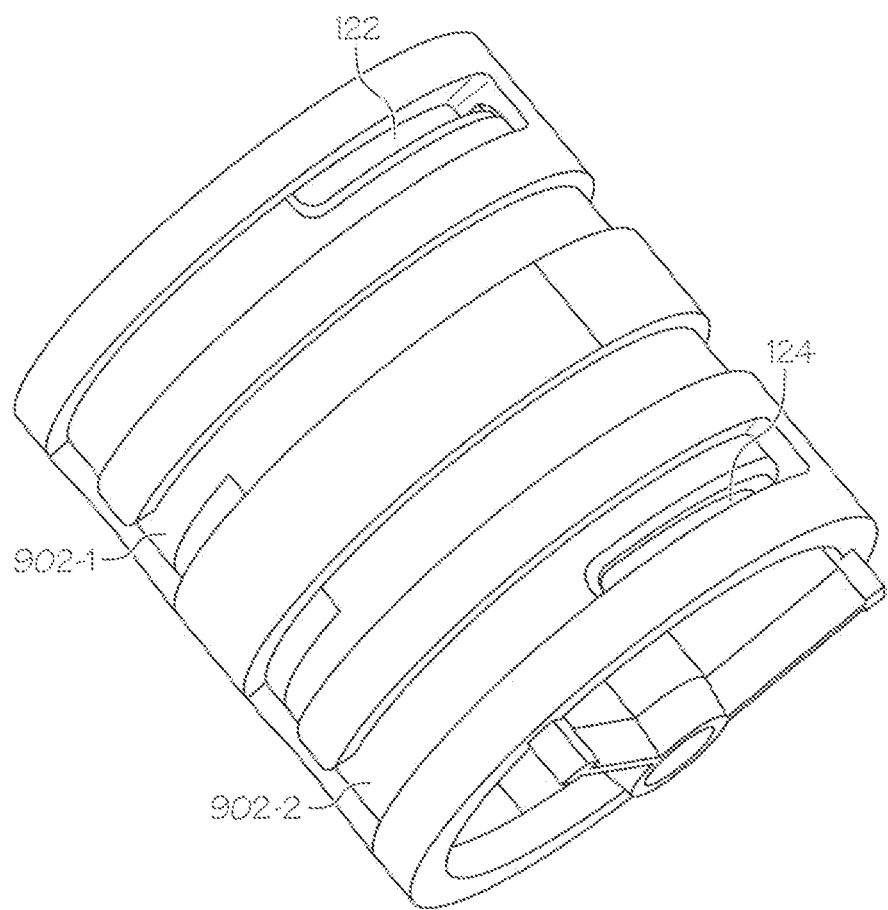

With reference now to FIGS. 9 and 10, another embodiment of the LFE 106 that may be used to implement the flow sensor 100 is depicted. This LFE 106 includes integrated bypass channels 902 (e.g., 902-1, 902-1). In particular, the bypass channels 902 are configured as recesses in the outer surface 904 of the LFE 106 that wrap around the perimeter of the LFE 106 and fluidly communicate the first and second bypass taps 122, 124 with the bypass flow channel 118. With this configuration, when the LFE 106 is disposed in the main flow channel 112, it implements a pair of captured bypass channels 902 that may be relatively long, while minimizing space. It will be appreciated that the bypass channels 902 may replace all or part of the bypass flow channel 118 depicted in FIGS. 1-4.

The LFE 106 depicted in FIGS. 9 and 10 is also configured to include a keying feature 906, which allows the LFE 106 to be rotated to a plurality of different rotational positions within the main flow channel 112. Varying the rotational position of the LFE 106 will change the effective length of the bypass channels 902, and thereby change the fluid flow rate through the bypass channels 902. For example, in a high flow position the length of the bypass channels 902 is relatively long to limit the bypass flowrate, which is useful for high flow rate products. In a low flow position, the length of the bypass channels is relatively short, allowing more flow through the bypass flow channel 118, which is useful for low flow rate product.

In one particular embodiment, when the LFE 106 is disposed within the main flow channel 112 in the high flow position, a portion of the fluid flowing through the LFE will flow, for example, out the first bypass tap 122, traverse the entire length of the first bypass channel 902-1, and then enter the bypass flow channel 118. The fluid in the bypass flow channel 118 will then exit the bypass flow channel 118, traverse the entire length of the second bypass channel 902-2, and then through the second bypass tap 124, and back into the LFE 106. Conversely, when the LFE 106 is disposed within the main flow channel 112 in the low flow position, a portion of the fluid flowing through the LFE will flow, for example, out the first bypass tap 122, and then directly enter the bypass flow channel 118 without traversing the first bypass channel 902-1. Similarly, the fluid in the bypass flow channel 118 will then exit the bypass flow channel 118, flow through the second bypass tap 124, and back into the LFE 106, without traversing the second bypass channel 902-2.

The LFE 106 depicted in FIGS. 9 and 10 and described above is merely exemplary of the configuration of one embodiment. It will be appreciated that the LFE 106 may be variously configured. For example, as depicted in FIGS. 11-14, the LFE 106 may be implemented such that one or both of the bypass channels 902 may be implemented in a serpentine configuration, thereby providing an even longer bypass flow channels 902. It will be appreciated that the depicted serpentine configuration is merely exemplary of one alternate bypass channel implementation. As FIGS. 11-14 also depict, one or both of the first and second bypass taps 122, 124 may be disposed outside of the laminarizing zone of the of the LFE 106.

Figure 15:
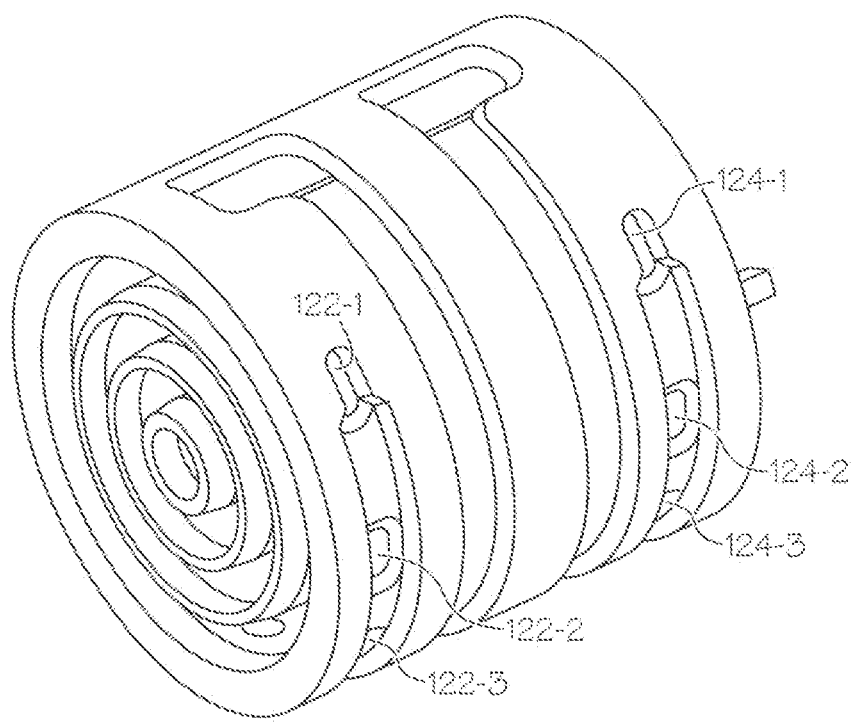
FIGS. 15 and 16 depict plan views of still another embodiment of a laminar flow element that may be used to implement the flow sensor of FIGS. 1-4.
Figure 16:
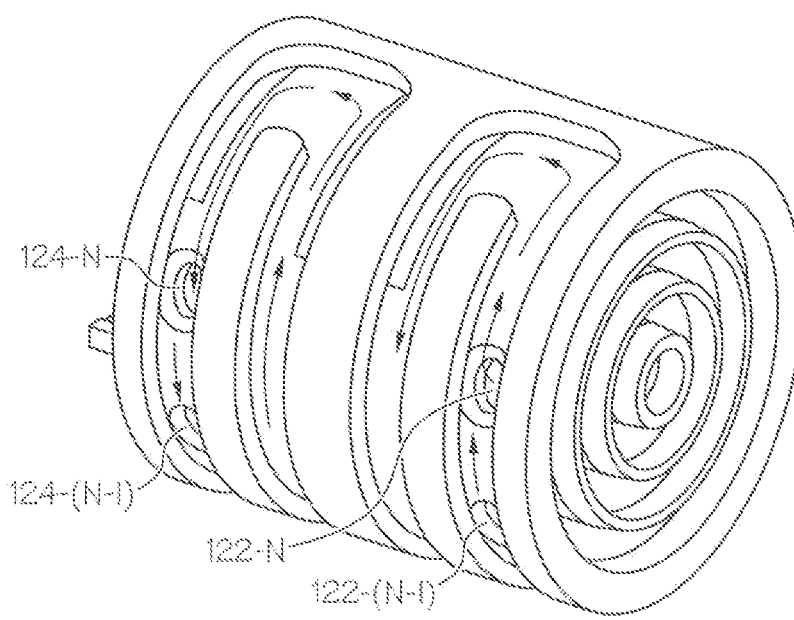

In addition to the variations in the disposition of the first and second bypass taps 122, 124, and as was previously noted, the configuration of the first and second bypass taps 122, 124 may also be varied. For example, and with reference now to FIGS. 15 and 16, the first and second bypass taps 122, 124 may each be implemented as multiple taps 122-1, 122-2, 122-3, . . . 122-N, 124-1, 124-2, 124-3, . . . 124-N. The number, size, and shape of the first and second bypass taps 122, 124 may vary, but is preferably selected to maintain an approximately continuous hydraulic diameter through the first and second bypass channels 902. Although the multiple taps are depicted as being implemented with an LFE 106 that has serpentine flow channels 902, it will be appreciated that the multiple taps could also be implemented in the LFE 106 configuration depicted in FIGS. 5-7, 9, and 10.

Figure 17:
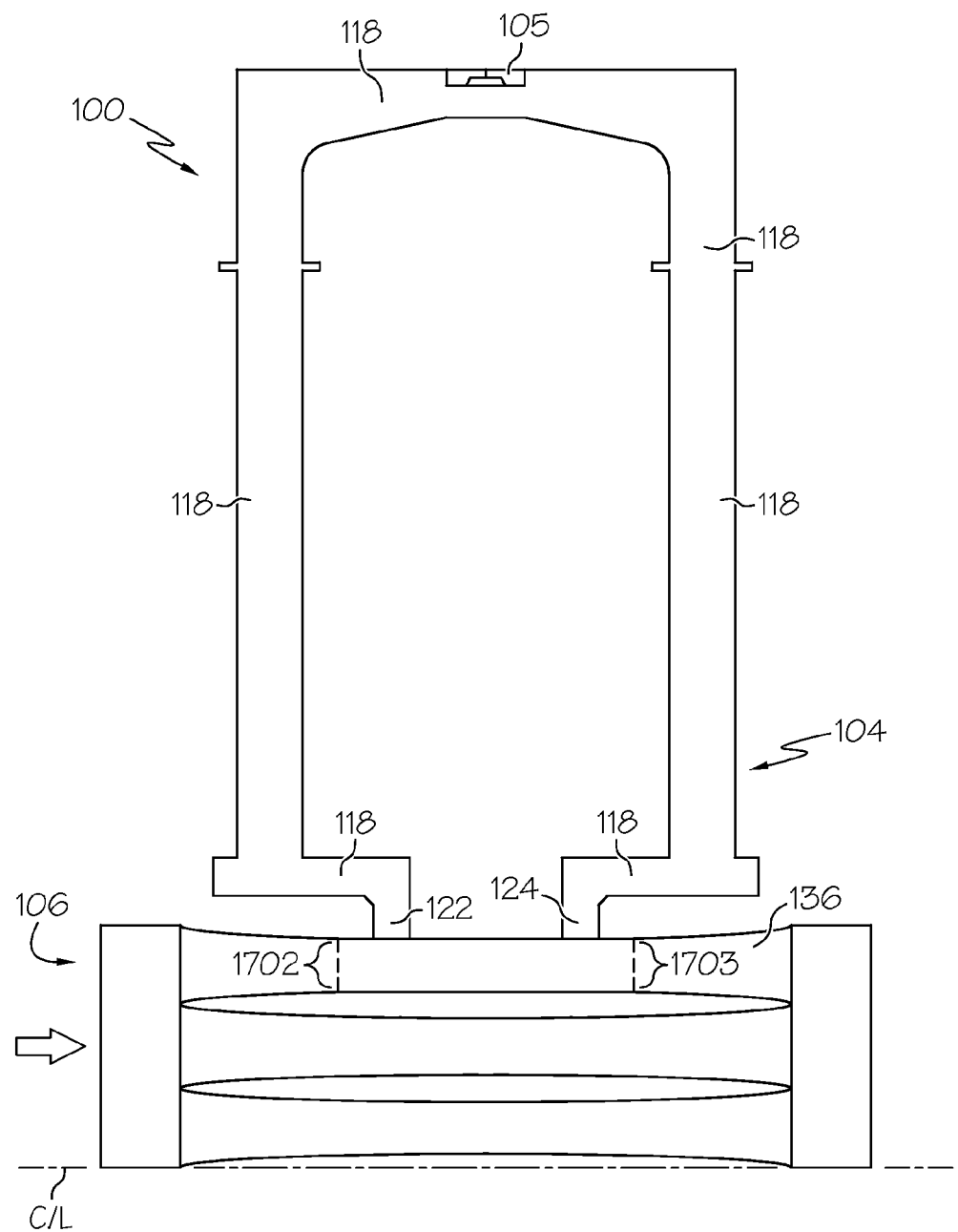
FIG. 17 depicts a simplified cross section view of a portion of another embodiment of a flow sensor.

Referring now to FIG. 17, a simplified cross section view of a portion of another embodiment of the flow sensor 100 is depicted. In this embodiment, the LFE 106 is configured with a geometry that maintains substantially equal fluid velocities at the first and second bypass taps 122, 124. As a result, the flow sensor 100 exhibits symmetrical flow sensitivity in both directions of flow 126, 128. With equal fluid velocities at the bypass taps 122, 124, the static pressures exerted at these taps are independent of acceleration of velocity (see Bernoulli equation). To implement this, the LFE 106 and/or main flow channel 112 are configured such that there is a uniform cross-section between area 1702 and 1703 between the bypass taps 122, 124 in the main flow channel 112.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit or software components, e.g., memory elements, digital signal processing elements, logic elements, look-up tables, mathematical functions or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, end-user computer or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The word "exemplary" is used exclusively herein to mean "serving as an example, instance, or illustration." Any embodiment described herein as "exemplary" is not necessarily to be construed as preferred or advantageous over other embodiments.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flow sensor, comprising:
  a main flow body having a first main flow port, a second main flow port, and a main flow channel between the first main flow port and the second main flow port;
  a laminar flow element disposed within the main flow channel between the first main flow port and the second main flow port and having a first end, a second end, and an outer surface, the first end facing the first main flow port, the second end facing the second main flow port;

a bypass element disposed adjacent to the main flow body and including a bypass flow channel;

a first bypass tap extending through the outer surface of the laminar flow element and disposed between the first end and the second end of the laminar flow element, the first bypass tap fluidly communicating the main flow channel with the bypass flow channel; and a second bypass tap extending through the outer surface of the laminar flow element and disposed between the first end and the second end of the laminar flow element, the second bypass tap fluidly communicating the main flow channel with the bypass flow channel, wherein:

the bypass flow channel has a cross sectional area, and the first bypass tap and the second bypass tap each have a cross sectional area that is greater than the cross sectional area of the bypass flow channel.

2. The flow sensor of claim 1, wherein:

the main flow channel is oriented about an axis that extends between the first main flow port and the second main flow port; and the first and second bypass taps are each configured in a direction perpendicular to the axis.

3. The flow sensor of claim 2, wherein:

the first bypass tap and the second bypass tap each have a width in a direction parallel to the axis and a length in a direction perpendicular to the width; and the width is less than the length.

4. The flow sensor of claim 1, wherein the bypass channel, the first bypass tap, and the second bypass tap have approximately equal hydraulic diameters.

5. The flow sensor of claim 1, further comprising:

a flow sensor coupled to the bypass element and disposed within the bypass flow channel, the flow sensor configured to sense fluid flow through the bypass flow channel.

6. The flow sensor of claim 1, wherein:

the main flow channel is oriented about an axis that extends between the first main flow port and the second main flow port; and the laminar flow element is configured with a geometry that maintains substantially equal fluid velocities along the direction of the axis at the first bypass tap and the second bypass tap.

7. The flow sensor of claim 6, wherein the first and second bypass taps are configured perpendicular to the axis.

8. A flow sensor, comprising:

a main flow body having a first main flow port, a second main flow port, a main flow channel between the first main flow port and the second main flow port, a first bypass tap, a second bypass tap, and a bypass flow channel;

a laminar flow element disposed within the main flow channel between the first main flow port and the second main flow port and having a first end and a second end, the first end facing the first main flow port, the second end facing the second main flow port; and a flow sensor coupled to the main flow body and disposed within the bypass flow channel, the flow sensor configured to sense fluid flow through the bypass flow channel;

wherein:

the first bypass tap is disposed between the first end and the second end of the laminar flow element, and fluidly communicates the main flow channel with the bypass flow channel, the second bypass is tap disposed between the first end and the second end of the laminar flow element, and fluidly communicates the main flow channel with the bypass flow channel, the bypass flow channel has a cross sectional area, and the first bypass tap and the second bypass tap each have a cross sectional area that is greater than the cross sectional area of the bypass flow channel.

9. The flow sensor of claim 8, wherein the bypass flow channel, the first flow element sensor tap, and the second flow element sensor tap have approximately equal hydraulic diameters.

10. The flow sensor of claim 8, wherein:

the main flow channel is oriented about an axis that extends between the first main flow port and the second main flow port; and the first and second bypass taps are each configured in a direction perpendicular to the axis;

the first bypass tap and the second bypass tap each have a width and in a direction parallel to the axis and a length in a direction perpendicular to the width; and the width is less than the length.

11. The flow sensor of claim 8, wherein:

the main flow channel is oriented about an axis that extends between the first main flow port and the second main flow port; and the laminar flow element is configured with a geometry that maintains substantially equal fluid velocities along the direction of the axis at the first bypass tap and the second bypass tap.

12. The flow sensor of claim 11, wherein the first and second bypass taps are configured perpendicular to the axis.

13. A flow sensor, comprising:

a main flow body having a first main flow port, a second main flow port, a main flow channel between the first main flow port and the second main flow port, a first bypass tap, and a second bypass tap;

a laminar flow element disposed within the main flow channel between the first main flow port and the second main flow port and having a first end, a second end, and an outer surface, the first end facing the first main flow port, the second end facing the second main flow port; and a bypass element disposed adjacent to the main flow body and having a bypass flow channel, wherein:

the first bypass tap is disposed between the first end and the second end of the laminar flow element, and fluidly communicates the main flow channel with the bypass flow channel, the second bypass tap is disposed between the first end and the second end of the laminar flow element, and fluidly communicates the main flow channel with the bypass flow channel, the main flow channel is oriented about an axis that extends between the first main flow port and the second main flow port, the first bypass tap and the second bypass tap each have a width and in a direction parallel to the axis and a length in a direction perpendicular to the width, the width is less than the length, and the first bypass tap and the second bypass tap each have a cross sectional area that is greater than the cross sectional area of the bypass flow channel.

14. The flow sensor of claim 13, wherein, the first and second bypass taps are each configured in a direction perpendicular to the axis.

15. The flow sensor of claim 13, wherein:
the laminar flow element is configured with a geometry that maintains substantially equal fluid velocities along the direction of the axis at the first bypass tap and the second bypass tap.

* * * * *